US011935153B2

(12) United States Patent
Korobkov et al.

(10) Patent No.: US 11,935,153 B2
(45) Date of Patent: Mar. 19, 2024

(54) DATA COMPRESSION SUPPORT FOR ACCELERATED PROCESSOR

(71) Applicants: ATI Technologies ULC, Markham (CA); Advanced Micro Devices, Inc., Santa Clara, CA (US)

(72) Inventors: Sergey Korobkov, San Diego, CA (US); Jimshed B. Mirza, Markham (CA); Anthony Hung-Cheong Chan, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/135,973

(22) Filed: Dec. 28, 2020

(65) Prior Publication Data
US 2022/0207644 A1 Jun. 30, 2022

(51) Int. Cl.
*G06T 1/60* (2006.01)
*G06T 1/20* (2006.01)
*G06T 9/00* (2006.01)

(52) U.S. Cl.
CPC .............. *G06T 1/60* (2013.01); *G06T 1/20* (2013.01); *G06T 9/00* (2013.01)

(58) Field of Classification Search
None
See application file for complete search history.

(56) References Cited

U.S. PATENT DOCUMENTS

| 9,880,746 B1 * | 1/2018 | Shilane | G06F 3/0685 |
| 2015/0019813 A1 * | 1/2015 | Loh | G06F 12/0866 711/122 |
| 2016/0300320 A1 * | 10/2016 | Lourcha | G06T 15/005 |

* cited by examiner

*Primary Examiner* — Yi Wang
(74) *Attorney, Agent, or Firm* — Volpe Koenig

(57) ABSTRACT

Data processing methods and devices are provided. A processing device comprises memory and a processor. The memory, which comprises a cache, is configured to store portions of data. The processor is configured to issue a store instruction to store one of the portions of data, provide identifying information associated with the one portion of data, compress the one portion of data; and store the compressed one portion of data across multiple lines of the cache using the identifying information. In an example, the one portion of data is a block of pixels and pixels and the processor is configured to request pixel data for a pixel of a compressed block of pixels, send additional requests for data for other pixels determined to belong to the compressed pixel block and provide an indication that the requests are for pixel data belonging to the compressed block of pixels.

20 Claims, 5 Drawing Sheets

DATA COMPRESSION SUPPORT FOR ACCELERATED PROCESSOR

BACKGROUND

Data compression is used to reduce the number of bits used to represent the data (e.g., image data, texture data, compute data and other types of data). Compression is useful because it reduces the resources (e.g., number or size) for storing and transmitting the data. For example, when the data to be compressed is image data, a frame or slice of image data is typically divided into blocks of pixels, each pixel having a value (e.g., luminance values and chrominance values) represented by one or more bits. The number of bits used to represent a block of pixel data is compressed to reduces the resources for storing and/or transmitting the image data.

BRIEF DESCRIPTION OF THE DRAWINGS

A more detailed understanding can be had from the following description, given by way of example in conjunction with the accompanying drawings wherein.

DETAILED DESCRIPTION

Figure 1:
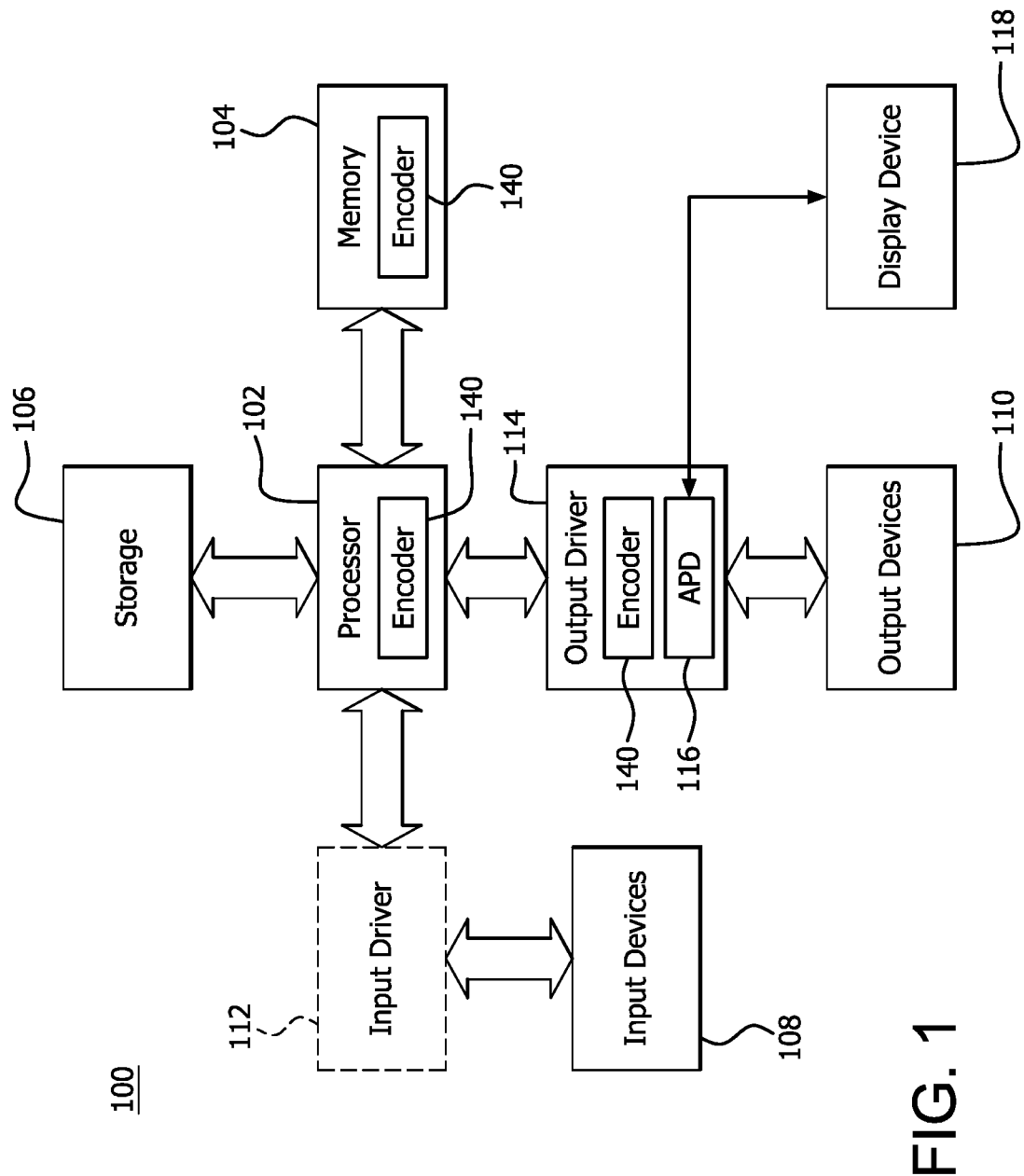
FIG. 1 is a block diagram of an example device in which one or more features of the disclosure can be implemented.

Data (e.g., image data, texture data, compute data and other types of compressible data) is transferred between main memory and cache memory in fixed sized cache lines. When a cache line is copied from memory into the cache, a cache entry is created, which includes the data and the requested memory address. When a processor reads or writes to a memory address, the processor first checks for the data of the requested address in any cache lines that may contain the address. When the processor determines that the requested address is in the cache (i.e., the data, corresponding to the address, resides in the cache), a cache hit occurs and the processor reads or writes the data in the cache line. When the processor determines that the requested address is not in the cache, a cache miss occurs, a new entry can be allocated and the data can be copied from another portion of memory to the cache.

Efficient data compression is typically facilitated by using the largest size block that is supported by a particular compression algorithm being used to compress the data. To this end, conventional data compression techniques use a cache line that is equal to or greater than the largest size block supported by the compression algorithm. Accordingly, any request for data results in a single cache line fill. In some cases, the data in a block is compressed efficiently such that the compressed block is much smaller than the uncompressed block.

In a conventional data compression system which compresses image data, a single pixel load (read) instruction is executed, for example, according to the following steps. The single pixel is determined, via metadata, to be part of a pixel block (e.g., an eight-pixel block) which has been compressed to data equivalent to less than the eight pixels (e.g., compressed to data occupying space of three pixels). The data equivalent to the data for three pixels still represents the data for the eight pixels in the block (i.e., lossless compression). Based on the metadata, a single request is sent to a cache controller, which determines whether the three pixels reside in a cache line of a local cache. If the compressed data does not reside in the cache, a load to memory is issued to fetch the data. If the compressed data does reside in a cache line, then the data is fetched from the cache and sent to the decoder. The decoder decompresses the compressed block of data, which includes the three pixels, and sends (i.e., returns) the requested pixel back to the processor that issued the pixel load instruction.

Features of the present disclosure include data compression devices and methods which enable compressed portions of any type of data (e.g., pixel blocks of image data, portions of texture data, portions of compute data and portions of other types of compressible data) to be stored across multiple cache lines and allow the largest block size supported by a compression algorithm to be larger than a cache line size. For example, for compression of image data, in response to a single pixel load instruction in which the single pixel and one or more other pixels are determined to be compressed pixels of a same block of pixels, multiple requests (i.e., a set of requests) are issued to fetch the requested compressed pixel as well as one or more other pixels corresponding to the same compressed block of pixels.

Although features of the disclosure can be implemented for any type of data, for simplification purposes, the examples provided herein describe the storing of portions of image data (e.g., data for blocks of pixels) across multiple cache lines. For example, identification information (e.g., a single bit) is provided, to the cache, identifying each of the multiple requests as being requests for data (e.g., pixel data) which correspond to the same compressed block of pixels. Accordingly, compressed data, corresponding to the same block, residing across one or more lines in the cache is identified. The fetched compressed data, to be decompressed, is provided to the cache controller along with indications that the fetched compressed data correspond to the same compressed block of pixels. An indication is also provided, to the cache controller, when the last data from the multiple requests is sent to the cache controller. The identification information and the indications facilitate the ordering of different sets of multiple requests as well as maintaining the grouping of each set of multiple requests, regardless of whether requests in a set of multiple requests result in a cache hit or a cache miss. Features of the present disclosure provide a better overall compression ratio without sacrificing efficient use of the cache.

A data processing method is provided which comprises issuing a store instruction to store one of a plurality of portions of data, providing identifying information associated with the one portion of data, compressing the one portion of data and storing the compressed one portion of data across multiple lines of a cache using the identifying information.

A data processing method is provided which comprises issuing a load instruction including a request, from memory, for pixel data corresponding to a pixel of a compressed block of pixels, sending additional requests for pixel data for other pixels which are determined, via pixel block information included with the load instruction, to belong to the compressed block of pixels; and fetching pixel data of the compressed pixel block from multiple lines of a cache.

A data processing device is provided which comprises memory and a processor. The memory, which comprises a cache, is configured to store portions of data. The processor is configured to issue a store instruction to store one of the plurality of portions of data, provide identifying information associated with the one portion of data, compress the one portion of data and store the compressed one portion of data across multiple lines of the cache using the identifying information.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. As shown in FIG. 1, the output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. In addition to processing compute and graphics rendering commands and providing pixel output to display device 118, APD 116 can also control the encoder 140 for encoding video images according to features of the disclosure. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

A video encoder 140 is shown in two different alternative forms. In a first form, the encoder 140 is software that is stored in the memory 104 and that executes on the processor 102 as shown. In a second form, the encoder 140 is at least a portion of a hardware video engine (not shown) that resides in output driver 114. In other forms, the encoder 140 is a combination of software and hardware elements, with the hardware residing, for example, in output drivers 114, and the software executed on, for example, the processor 102.

Figure 2:
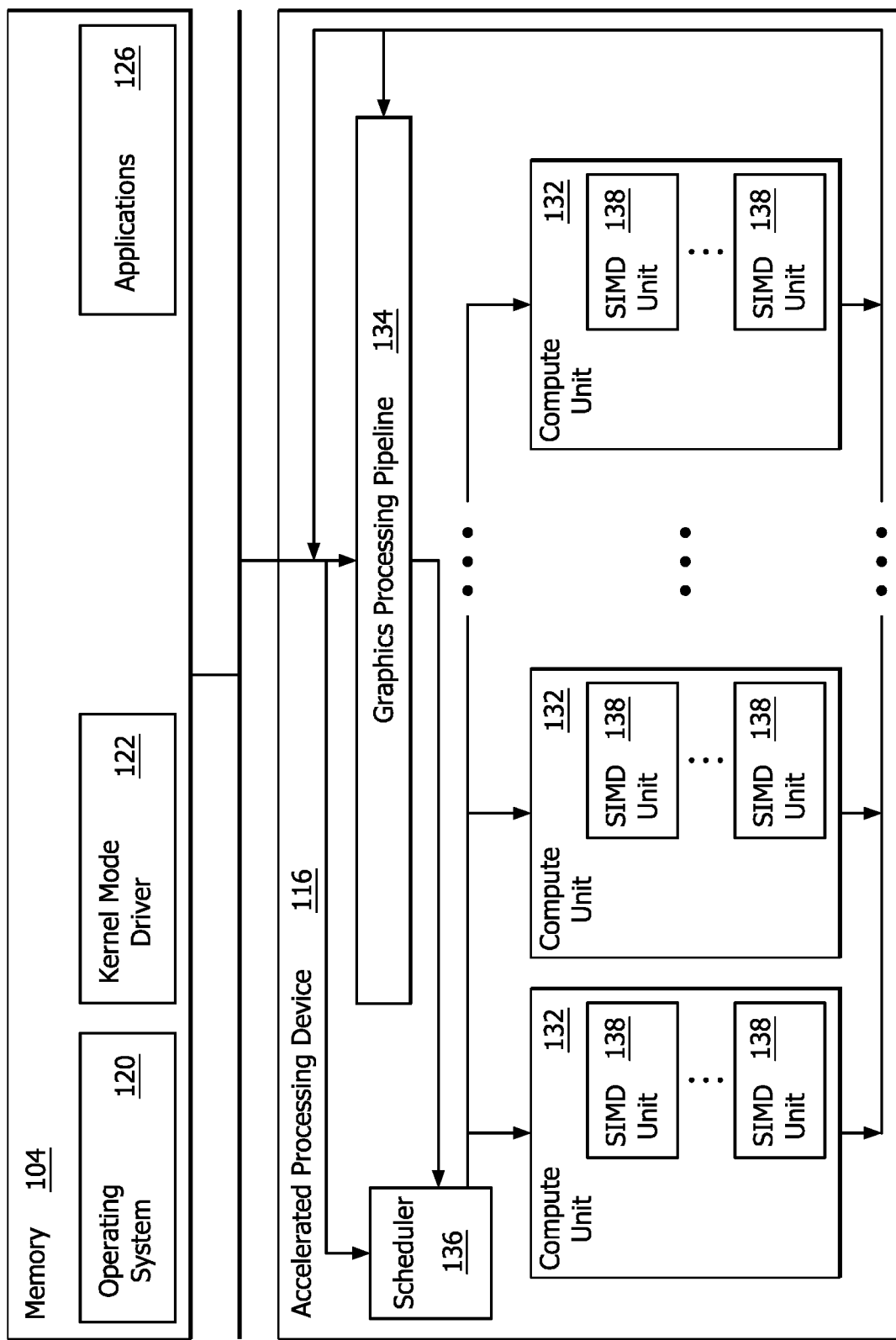
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

As described above, although features of the disclosure can be implemented for any type of data, for simplification purposes, the examples provided herein describe the storing of portions of image data (e.g., data for blocks of pixels) across multiple cache lines. For example, a pixel block is typically compressed such that the number of compressed pixels in the block is less than the number of pixels in the block. Because the cache line in conventional systems is set to the size of the uncompressed block (in case that the compressed block is the same size as the uncompressed block), however, the size of the cache line becomes superfluous because the cache line includes wasted space in which no data is stored. Accordingly, the wasted space equates to inefficient use of the cache line. In addition, the cache typically includes multiple cache lines with wasted (i.e., unused) space, contributing to an even greater overall inefficiency.

For example, for a block based compression of a 4×2 block of pixels (i.e., 8 pixels), a single pixel load (i.e., read) instruction in a conventional data compression system is executed according to the following steps. The single pixel is determined, via metadata, to be part of the 8 pixel block which has been compressed to 3 pixels. Based on the metadata, a single request is sent to a cache controller, which determines whether the 3 pixels reside in a cache line of a local cache. If the compressed data does not reside in the cache, a load to memory is issued to fetch the data. If the compressed data does reside in a cache line, then the data is fetched from the cache and sent to the decoder. The decoder decompresses the compressed block of 3 pixels and sends (i.e., returns) the requested pixel back to the processor that issued the pixel load instruction.

A single pixel store (write) instruction in a conventional data compression system is executed according to the following steps. First, the block of 8 pixels is processed by a metadata processor. The metadata processor sends the 8 pixel block to the encoder for compression. The 8 pixel block is compressed, by the encoder. For example, the encoder compresses 8 pixel block to 3 pixels. The compressed 3 pixel block is then stored in a single cache line in the local cache.

Figure 3:
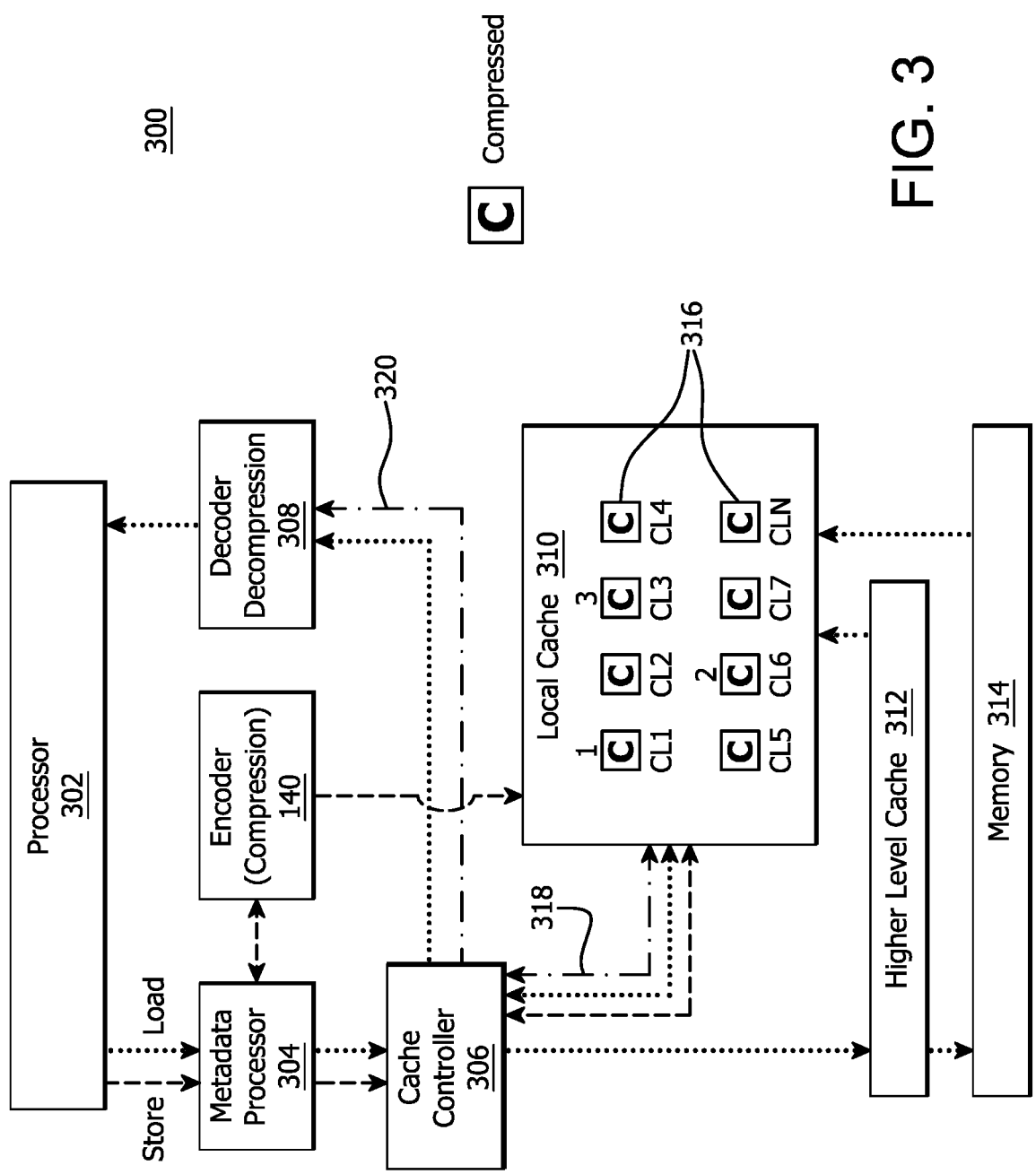
FIG. 3 is a block diagram illustrating exemplary components of a processing device in which one or more features of the disclosure can be implemented.

FIG. 3 is a block diagram illustrating exemplary components of a processing device 300 in which one or more features of the disclosure can be implemented. Processing device 300 is used to process (e.g., encode and decode) image data as described in more detail below. As shown in FIG. 3, processing device 300 includes processor 302, metadata processor 304, cache controller 306, encoder 140, decoder 308, local cache 310 (e.g., L1 cache), higher level cache 312 (e.g., L2 cache or other level cache) and memory 314 (e.g., main memory).

Processor 302 is, for example, processor 102 (shown in FIG. 1), APD 116 (shown in FIGS. 1 and 2) or one or more compute units 132. Processor 302 is configured to control (e.g., via instructions) various components (e.g., metadata processor 304, cache controller 306, encoder 140, decoder 308) of processing device 300. For example, processor 302 is configured to control the encoder 140, to encode the image data, and control the decoder 308, to decode the image data according to features of the disclosure.

Metadata processor 304 is configured to process metadata associated with the image data. Cache controller 306 is configured to receive requests to access (e.g., read from local cache 310 and write to local cache 310) and control access to the local cache 310 based on the received requests and metadata received from the metadata processor 304.

The functions performed by the metadata processor 304 and cache controller 306 can be implemented in hardware, software or a combination or hardware and software. When implemented in hardware, the metadata processor 304 and cache controller are, for example, separate from the processor 302 and are controlled by processor 302 to implement their corresponding functions. Alternatively, processor 302, metadata processor 304 and cache controller 302 are integrated as a single processor.

Encoder 140 is configured to receive data (e.g., image data) and instructions from processor 302 and encode (e.g., compress) the image data. The image data can be received from one or more video sources, such as a video capture device (e.g., a camera), a storage device (e.g., storage 106), a video content provider, and a device for generating graphics (e.g., APD 116).

The decoder 308 is configured to decode (e.g., decompress) the encoded image data for display (e.g., at display device 118 shown in FIG. 1). In the example shown in FIG. 3, the decoder 308 is part of the processing device 300. That is, the image data is transmitted (e.g., via a local device bus) to the decoder 308 on the same processing device 300. The encoder and decoder are, for example, integrated as one device (e.g., a codec) in processing device 300.

Alternatively, the decoder 308 is separate from processing device 300 and the encoded video image data is sent (e.g., via a network interface controller (NIC)) to the decoder 308 over one or more networks (e.g., local area network), including wired (e.g., Ethernet) or wireless networks (e.g., via WiFi, Bluetooth, and other wireless standards).

As shown in FIG. 3, local cache 310 stores compressed pixel data 316, for pixels belonging to the same pixel block, across multiple cache lines (i.e., CL1, CL2, . . . CLN). Accordingly, the largest block size supported by a compression algorithm is enabled to be larger than a cache line size.

Figure 4:
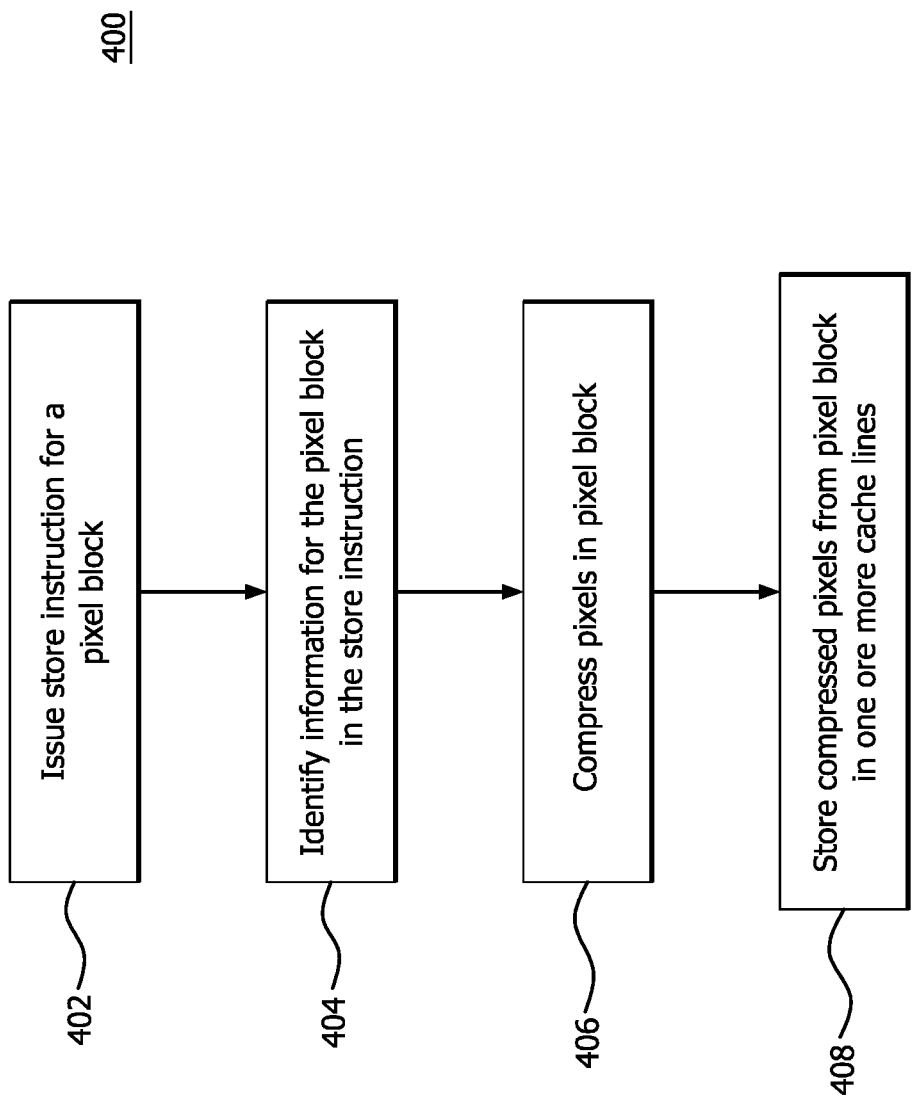
FIG. 4 is a flow diagram illustrating an example method of executing a pixel store instruction according to features of the present disclosure.
Figure 5:
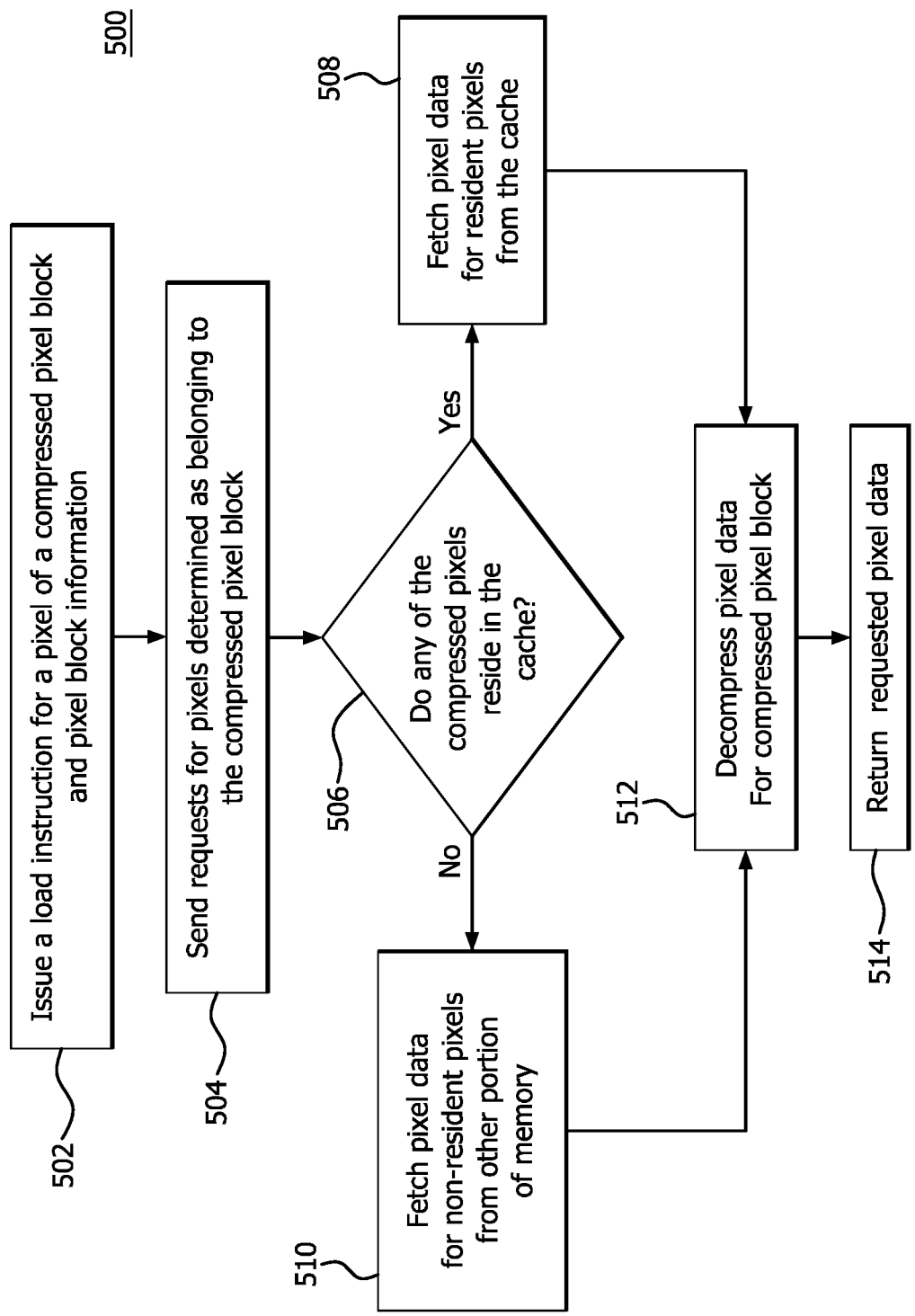
FIG. 5 is a flow diagram illustrating an example method of executing a pixel load instruction according to features of the present disclosure.

FIGS. 4 and 5 illustrate example methods for executing different types of instructions (i.e., store instruction and load instruction) according to features of the present disclosure. The example methods illustrated in FIGS. 4 and 5 are described with reference to the block diagram shown in FIG. 3. For simplified explanation purposes, the example methods described in FIGS. 4 and 5 are based on block-based data compression for blocks of 8 pixels (e.g., a 4×2 block of pixels) of a video image (e.g., frame) and compressing the block of 8 pixels to 3 pixels for the block. Features of the present disclosure can be implemented, however, by block-based data compression for any sized block of pixels (i.e., any number of pixels per block) at a time and compressing the pixels in the block to any number of pixels (e.g., reducing the number of pixels or maintaining the same number of pixels).

FIG. 4 is a flow diagram illustrating an example method 400 of executing a pixel store instruction (i.e., store pixel data from one or more registers into memory) according to features of the present disclosure.

As shown in block 402, the example method 400 includes issuing an instruction to store pixel data (e.g., chrominance and luminance pixel values), for a block of pixels, from one or more registers (not shown) accessible to the processor 302, to memory (e.g., cache memory or main memory). For example, the store instruction is a request to store pixel data for a block of 8 pixels.

As shown at block 404, the method 400 includes identifying the block of 8 pixels in the store instruction. For example, metadata processor 304 receives the store instruction and the metadata and identifies, via the metadata, the block of 8 pixels, requested to be stored, in the store instruction.

As shown at block 406 the method 400 includes compressing the pixels in the block of 8 pixels. For example, the block of 8 pixels is sent, by the metadata processor 304, to the encoder 140, which compresses the block of 8 pixels to 3 pixels.

As shown at block 408, the method 400 includes storing the 3 compressed pixels into one or more cache lines. For example, the metadata processor 304 sends the processed metadata, identifying the block of 8 pixels in the store instruction, to the cache controller 306. The cache controller 306 uses an address, associated with each piece of issued data and identifying a target cache line, to control the local cache 310 to store the compressed 3 pixels in one or more cache lines.

For example, as shown in FIG. 3, a plurality of pixel data 316 is stored across different cache lines (CL1, CL2, . . . CLN) in the local cache 310. As shown in FIG. 3, the first compressed pixel "1" of the block of 8 pixels is stored in the cache line CL1, the second compressed pixel "2" of the block of 8 pixels is stored in the cache line CL6, and the third compressed pixel "3" of the block of 8 pixels is stored in the cache line CL3. That is, the 3 compressed pixels (1, 2, and 3) are stored with identification information identifying the 3 compressed pixels as belonging to the same block of pixels and identifying the cache line in which each of the 3 compressed pixels are stored.

FIG. 5 is a flow diagram illustrating an example method 500 of executing a pixel load instruction (i.e., an instruction to read pixel data from memory and load the pixel data into registers) according to features of the present disclosure.

As shown in block 502, the example method 500 includes issuing a load instruction. That is, the processor 302 issues an instruction to read pixel data, for a pixel, from memory (e.g., cache memory or main memory) and load the data into registers (not shown) accessible to the processor 302. For example, the load instruction is a request for the data corresponding to the first pixel (i.e., pixel 1) in the example described above in FIG. 4.

As shown at block 504, the method 500 includes sending requests for pixels identified as belonging to the same compressed pixel block to which the first pixel belongs. That is, information identifying the pixel block in the store instruction, is also included with the load instruction, which includes information identifying the block of 8 pixels to which the compressed first pixel (i.e., pixel 1) belongs. For example, the information is metadata information included with the load instruction and the metadata processor 304 processes (e.g., parses) the pixel block information and sends the information to the cache controller 306. Based on the pixel block information, the metadata processor 304 determines that the first pixel (i.e., pixel 1) and the other compressed pixels (i.e., pixel 2 and pixel 3), previously stored in the local cache 310, belong to the same block of 8 pixels and sends 3 separate requests, for the pixel data corresponding to each of the 3 pixels identified as belonging to the block of 8 pixels.

As shown at block 506, the method 500 includes determining, via the pixel block information, whether or not any of the compressed pixels (e.g., pixel 1, pixel 2 and pixel 3) reside in the cache.

When it is determined, by the cache controller 306, that any of the 3 compressed pixels reside in the cache 310, the pixel data is fetched from the cache 310. For example, based on the pixel block information, received from the metadata processor 304, the cache controller 306 forwards each of the 3 requests to the cache. An indication (represented by arrow 318 in FIG. 3) is also sent to the cache 310 that each of the 3 separate requests are part of the same compressed pixel block. Accordingly, the grouping of each set of multiple requests is maintained, regardless of whether requests in a set of multiple requests results in a cache hit or a cache miss, thereby providing a better overall compression ratio without sacrificing efficient use of the cache.

In this example, the cache controller 306 determines that the first pixel (i.e., pixel 1) and the other compressed pixels (i.e., pixel 2 and pixel 3) are stored in the local cache 310. The cache controller 306 fetches the pixel data, corresponding to the 3 pixels, from the cache 310 and sends the pixel data to the decoder 308 to be decompressed. That is, based on the pixel block information, the cache controller 306 fetches the first compressed pixel (i.e., pixel 1) stored in the cache line CL1, the second compressed pixel (i.e., pixel 2) stored in the cache line CL6, and the third compressed pixel (i.e., pixel 2) stored in the cache line CL3. In addition, an indication (represented by arrow 320 in FIG. 3) is sent to the decoder 308 that the compressed pixel data, also being sent to the decoder 308, is part of the same compressed block of data.

When it is determined that any of the 3 compressed pixels do not reside in the cache 310, the pixel data is fetched from another portion of memory, such as a higher level cache 312 or memory (e.g., main memory) 314. The pixel data fetched from the other portion of memory is written to the cache 310 and stored on any one of the cache lines (CL1, CL2, . . . CLN). The data is then provided to the cache controller 306 and decoder 308 in the same manner as described above.

The compressed pixel data is then decompressed by the decoder at block 512. The decompressed data is returned to the requesting processor (e.g., 302), at block 514, and stored in the registers accessible to the requestor (e.g., processor 302).

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, 302, metadata processor 304, cache controller 306, the input driver 112, the input devices 108, the output driver 114, the output devices 110, the accelerated processing device 116, the scheduler 136, the graphics processing pipeline 134, the compute units 132, the SIMD units 138, the encoder 140 and the decoder 308 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A data processing method, comprising:
   issuing a store instruction to store one uncompressed portion of data of a plurality of uncompressed portions of data, the one uncompressed portion of data comprising data elements and the store instruction comprising identification information identifying the data elements as belonging to the one uncompressed portion of data;
   identifying, via the identification information in the store instruction, the data elements as belonging to the one uncompressed portion of data;
   compressing the one uncompressed portion of data to provide a compressed portion of data; and
   storing compressed data elements of the compressed portion of data across multiple lines of a cache using the identification information.

2. The method of claim 1, wherein the identification information in the store instruction is metadata and the one uncompressed portion of data is identified by the metadata sent with the instruction.

3. The method of claim 1, wherein the plurality of uncompressed portions of data are portions of image data corresponding to blocks of pixels.

4. The method of claim 3, wherein the one uncompressed portion of data is an uncompressed block of pixels and pixels belonging to the uncompressed block of pixels are identified by metadata sent with the store instruction and the compressed portion of data is a corresponding compressed block of pixels, and
   the method further comprises:
   storing the identification information with the corresponding compressed block of pixels; and
   identifying, for the pixels belonging to the corresponding compressed block of pixels, a cache line in which the pixels are stored.

5. The method of claim 4, further comprising:
   issuing a load instruction including a request, from memory, for pixel data for a pixel of the compressed block of pixels, the load instruction comprising the identification information identifying the data elements as belonging to the compressed portion of data,
   sending additional requests for pixel data for other pixels which are determined, via pixel block information included with the load instruction, to belong to the compressed block of pixels; and
   providing an indication, using the identification information in the store instruction and the load instruction, that the request and the additional requests are for pixel data belonging to the compressed block of pixels.

6. The method of claim 5, further comprising:
   determining, via the pixel block information, whether or not pixel data of the compressed block of pixels resides in the cache;
   when pixel data of the compressed block of pixels is determined to reside in the cache, fetching the pixel data stored across the multiple lines of the cache; and
   when pixel data of the compressed block of pixels is determined to not reside in the cache, fetching the pixel data from another portion of memory and storing the pixel data fetched from the other portion of memory across the multiple lines of the cache.

7. The method of claim 1, further comprising:
   decompressing the compressed portion of data; and
   displaying the decompressed portion of data.

8. An image data processing method, comprising:
   issuing a load instruction including a request, from memory, for pixel data corresponding to a pixel of a compressed block of pixels, the load instruction comprising identification information identifying the pixel and other pixels as belonging to the compressed block of pixels, the identification information corresponding to previous identification information used to identify the pixel as belonging to the block of pixels prior to being compressed;

identifying, via the identification information in the load instruction, the pixel and the other pixels as belonging to the compressed block of pixels;

sending additional requests for pixel data for the other pixels which are determined, via the identification information included with the load instruction, to belong to the compressed block of pixels; and fetching pixel data of the compressed block of pixels from multiple lines of a cache.

9. The method of claim 8, further comprising:
providing an indication, using the identification information, that the request and the additional requests are for pixel data belonging to the compressed block of pixels.

10. The method of claim 8, further comprising:
determining, via the identification information, whether or not any of the pixel data of the compressed block of pixels resides in the cache;

when any of the pixel data of the compressed block of pixels is determined to not reside in the cache, fetching the pixel data from another portion of memory; and storing the pixel data fetched from the other portion of memory across the multiple lines of the cache.

11. The method of claim 8, further comprising:
sending the fetched pixel data to be decompressed; and
providing an indication, using the identification information, that the fetched pixel data is part of the compressed block of pixels; and
decompressing the fetched pixel data.

12. The method of claim 8, further comprising displaying the block of pixels on a display device.

13. A data processing device comprising:
memory, comprising a cache configured to store portions of data; and
a processor configured to:
issue a store instruction to store one uncompressed portion of data of a plurality of uncompressed portions of data, the one uncompressed portion of data comprising data elements, the store instruction comprising identification information identifying the data elements as belonging to the one uncompressed portion of data;
identify, via the identification information in the store instruction, the data elements as belonging to the one uncompressed portion of data;
compress the one portion of data to provide one compressed portion of data; and
store compressed data elements of the one compressed portion of data across multiple lines of the cache using the identification information.

14. The processing device of claim 13, further comprising an encoder, wherein the processor is configured to control the encoder to compress the one uncompressed portion of data.

15. The processing device of claim 13, further comprising a metadata processor, wherein the identification information in the store instruction is metadata and the processor is configured to control the metadata processor to identify the one uncompressed portion of data via the metadata sent with the instruction.

16. The processing device of claim 13, wherein the uncompressed portions of data are portions of image data corresponding to blocks of pixels.

17. The processing device of claim 16, wherein the one uncompressed portion of data is an uncompressed block of pixels and pixels belonging to the block of pixels are identified by metadata sent with the store instruction and the one compressed portion of data is the corresponding compressed block of pixels, and
the processor is configured to:
store the identification information with the compressed block of pixels; and
identify, for the pixels belonging to the compressed block of pixels, a cache line in which the pixels are stored.

18. The processing device of claim 17, wherein the processor is configured to:
issue a load instruction including a request, from memory, for pixel data for a pixel of the compressed block of pixels
identify, via identification information in the load instruction, the pixel and other pixels as belonging to the compressed block of pixels, the identification information corresponding to previous identification information used to identify the pixel as belonging to the block of pixels prior to being compressed;
send additional requests for pixel data for the other pixels which are determined, via pixel block information included with the load instruction, to belong to the compressed block of pixels; and
provide an indication that the request and the additional requests are for pixel data belonging to the compressed block of pixels.

19. The processing device of claim 18, wherein the processor is configured to:
determine, via the pixel block information, whether or not pixel data of the compressed block of pixels resides in the cache;
when pixel data of the compressed block of pixels is determined to reside in the cache, fetch the pixel data stored across the multiple lines of the cache; and
when pixel data of the compressed block of pixels is determined to not reside in the cache, fetch the pixel data from another portion of memory and storing the pixel data fetched from the other portion of memory across the multiple lines of the cache.

20. The processing device of claim 13, further comprising a display device configured to display the portions of data.

* * * * *